: US 11,705,845 B2
(45) Date of Patent: Jul. 18, 2023

(54) MOTOR CONTROL DEVICE

(71) Applicant: Hitachi Astemo, Ltd., Hitachinaka (JP)

(72) Inventor: Takami Suzuki, Utsunomiya (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 0 days.

(21) Appl. No.: 17/749,877

(22) Filed: May 20, 2022

(65) Prior Publication Data

US 2022/0385219 A1    Dec. 1, 2022

(30) Foreign Application Priority Data

May 31, 2021  (JP) ................. 2021-090898

(51) Int. Cl.
*H02P 21/00* (2016.01)
*H02P 21/22* (2016.01)
*H02P 27/08* (2006.01)
*H02M 7/5387* (2007.01)

(52) U.S. Cl.
CPC ............. *H02P 21/22* (2016.02); *H02P 27/08* (2013.01); *H02M 7/53871* (2013.01)

(58) Field of Classification Search
CPC .................................................. H02P 21/22
USPC ................................................. 318/400.02
See application file for complete search history.

(56) References Cited

U.S. PATENT DOCUMENTS

| | | | |
|---|---|---|---|
| 6,377,017 B2 * | 4/2002 | Kondou | H02P 25/03 318/811 |
| 7,723,944 B2 * | 5/2010 | Kitanaka | H02P 21/06 318/807 |
| 9,543,868 B2 * | 1/2017 | Takahashi | H02P 21/20 |
| 11,101,756 B2 * | 8/2021 | Takase | B62D 6/00 |
| 2006/0061310 A1 | 3/2006 | Takai et al. | |

FOREIGN PATENT DOCUMENTS

JP            4400389 B2    1/2010

* cited by examiner

*Primary Examiner* — Erick D Glass
(74) *Attorney, Agent, or Firm* — Cantor Colburn LLP

(57) ABSTRACT

This motor control device includes a vector control unit. The vector control unit includes: a current control unit that calculates a before-compensation d-axis voltage command value and a before-compensation q-axis voltage command value; a first non-interference control unit that calculates a first d-axis non-interference compensation value on the basis of a q-axis current command value to compensate for the before-compensation d-axis voltage command value and calculates a first q-axis non-interference compensation value on the basis of a d-axis current command value to compensate for the before-compensation q-axis voltage command value; and a second non-interference control unit that cancels out an interference component of a d-axis current generated in a specific rotation range of a motor with a q-axis current and an interference component of the q-axis current generated in the specific rotation range with the d-axis current by using a variable integral gain varying depending on a motor rotation speed.

12 Claims, 4 Drawing Sheets

MOTOR CONTROL DEVICE

CROSS REFERENCE TO RELATED APPLICATIONS

The present invention claims priority under 35 U.S.C. § 119 to Japanese Application No. 2021-090898 filed May 31, 2021, the entire content of which is incorporated herein by reference.

BACKGROUND OF THE INVENTION

Field of the Invention

The present invention relates to a motor control device.

Description of Related Art

A motor control device that performs vector control on an AC motor on the basis of a d-axis and a q-axis is known.

For example, Japanese Patent No. 4400389 discloses a motor control device that calculates a current command value on the basis of a torque command value input from the outside and a load reflection value that reflects a traveling load of a vehicle. Further, the motor control device disclosed in Japanese Patent No. 4400389 calculates a voltage command value by performing a feedback calculation on the basis of a deviation between the calculated current command value and an actual current value.

SUMMARY OF THE INVENTION

Incidentally, a relationship between a d-axis current value and a d-axis voltage value is influenced by a q-axis current value. Further, a relationship between the q-axis current value and a q-axis voltage value is influenced by the d-axis current value. That is, a d-axis and a q-axis interfere with each other. In order to curb the influence of such mutual interference components, non-interference control for adding or subtracting a compensation value for canceling out interference components to or from a voltage command value may be performed. However, the interference components also include an interference component having a large influence in a high-speed rotation range of a motor. That is, there is an interference component that is generated when the motor is in a specific rotation range. It has been difficult to reduce an influence of such interference components generated in the specific rotation range of the motor. When the influence of the interference component cannot be reduced, responsiveness of current control of the motor deteriorates.

The present invention has been made in view of the above-described problem, and an object of the present invention is to improve responsiveness of current control of a motor by reducing an influence of an interference component generated in a specific rotation range of the motor on the control in a motor control device that performs vector control.

The present invention adopts the following configuration as a measure for solving the above problem.

A first aspect adopts a configuration of a motor control device including a vector control unit configured to calculate a d-axis voltage command value and a q-axis voltage command value on a basis of a d-axis current command value and a q-axis current command value, in which the vector control unit includes: a current control unit configured to calculate a before-compensation d-axis voltage command value based on the d-axis current command value and a d-axis current detection value, and a before-compensation q-axis voltage command value based on the q-axis current command value and a q-axis current detection value; a first non-interference control unit configured to calculate a first d-axis non-interference compensation value on a basis of the q-axis current command value to compensate for the before-compensation d-axis voltage command value and calculate a first q-axis non-interference compensation value on a basis of the d-axis current command value to compensate for the before-compensation q-axis voltage command value; and a second non-interference control unit configured to cancel out an interference component of a d-axis current generated in a specific rotation range of a motor with a q-axis current and an interference component of the q-axis current generated in the specific rotation range with the d-axis current by using a variable integral gain varying depending on a motor rotation speed.

A second aspect adopts a configuration of the motor control device in the first aspect in which the current control unit includes: a d-axis integral gain multiplication unit configured to multiply a deviation between the d-axis current command value and the d-axis current detection value by an integral gain; a d-axis integrator configured to integrate an output from the d-axis integral gain multiplication unit; a q-axis integral gain multiplication unit configured to multiply a deviation between the q-axis current command value and the q-axis current detection value by an integral gain; and a q-axis integrator configured to integrate an output from the q-axis integral gain multiplication unit, and in which the second non-interference control unit adds or subtracts a calculation result based on the variable integral gain to or from an output of the d-axis integral gain multiplication unit and an output of the q-axis integral gain multiplication unit.

A third aspect adopts a configuration of the motor control device in the first or second aspect in which the second non-interference control unit sets the variable integral gain on a basis of a variable integral gain adjustment coefficient map in which the motor rotation speed and a variable integral gain adjustment coefficient are associated with each other.

A fourth aspect adopts a configuration of the motor control device in any one of the first to third aspect in which the first non-interference control unit calculates the first d-axis non-interference compensation value and the first q-axis non-interference compensation value by using a first non-interference gain varying depending on the motor rotation speed.

A fifth aspect adopts a configuration of the motor control device in the fourth aspect in which the first non-interference control unit sets the first non-interference gain on a basis of a first non-interference gain map in which the motor rotation speed and the first non-interference gain are associated with each other.

In each of the aspects of the present invention, the variable integral gain varies depending on the motor rotation speed, and an interference component that is generated in the specific rotation range of the motor is canceled out by using this variable integral gain. That is, in each of the aspects of the present invention, it is possible to change the variable integral gain depending on a rotation speed at a current point in time of the motor, select the variable integral gain suitable for the rotation speed of the motor, and cancel out the interference component. Therefore, in each of the aspects of the present invention, it becomes possible to improve responsiveness of the current control of the motor by reducing an influence of the interference component generated in the specific rotation range of the motor on the control in a motor control device that performs vector control.

DETAILED DESCRIPTION OF THE INVENTION

Hereinafter, an embodiment of a motor control device according to the present invention will be described with reference to the drawings.

Figure 1:
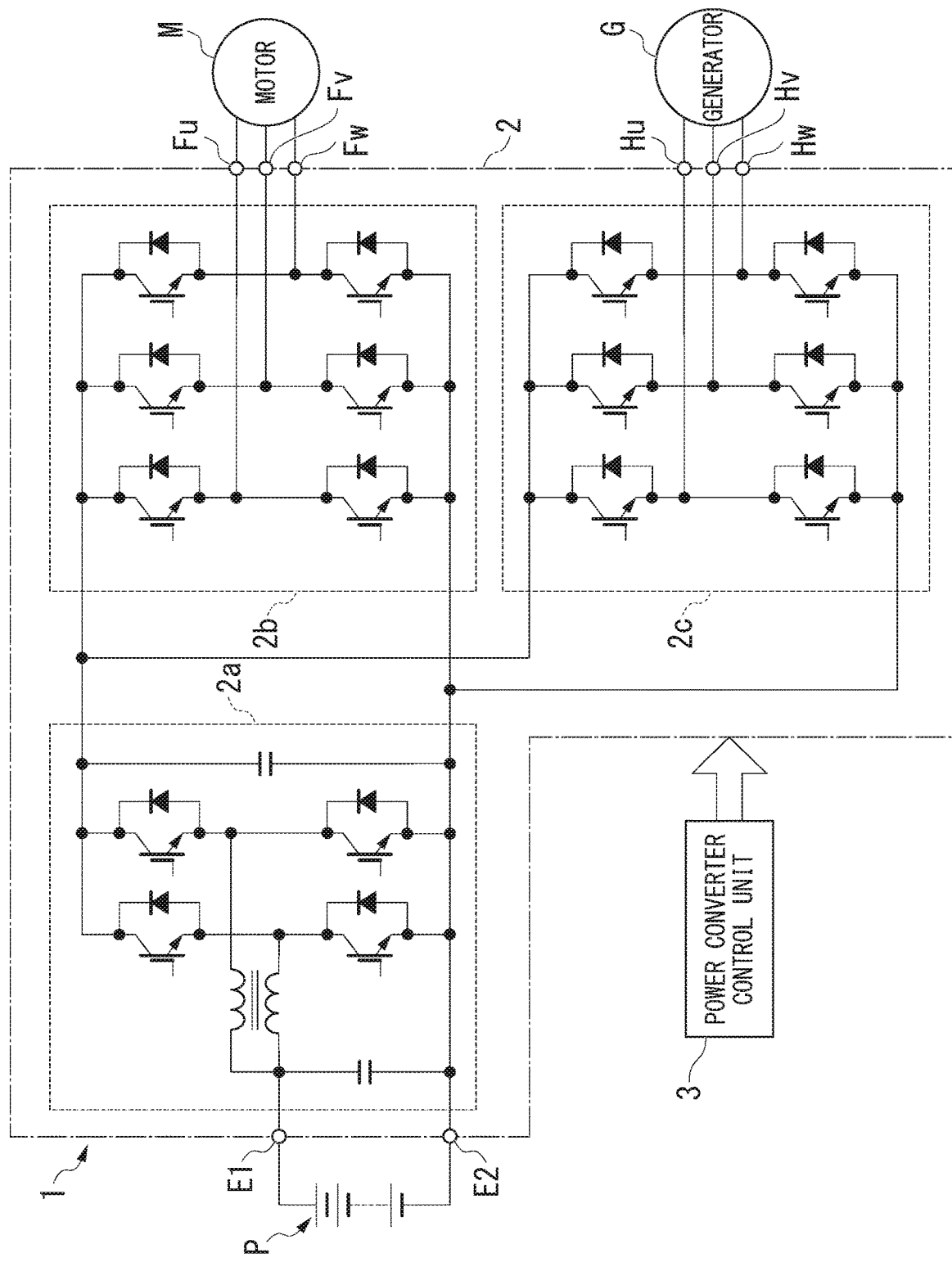
FIG. 1 is a circuit diagram schematically illustrating a schematic configuration of a control device that functions as a motor control device according to an embodiment of the present invention.

FIG. 1 is a circuit diagram schematically illustrating a schematic configuration of a control device 1 that functions as the motor control device of the embodiment. As illustrated in this figure, the control device 1 includes a power converter 2 and a power converter control unit 3.

As illustrated in FIG. 1, the power converter 2 includes a step-up and down converter 2a, a drive inverter 2b, and a power generation inverter 2c. The step-up and down converter 2a steps up a DC voltage output from a battery P at a predetermined step-up ratio. Further, the step-up and down converter 2a steps down a DC voltage output from the drive inverter 2b or the power generation inverter 2c at a predetermined step-down ratio. Such a step-up and down converter 2a includes, for example, a plurality of capacitors, a transformer, and a plurality of transformation insulated gate bipolar transistors (IGBTs), as illustrated in FIG. 1.

Such a step-up and down converter 2a is a power circuit called a so-called magnetically coupled interleaved chopper circuit. The step-up and down converter 2a selectively performs a step-up operation for stepping up a DC power input from the battery P via a pair of battery terminals and outputting a resultant DC power to the drive inverter 2b, and a step-down operation for stepping down a DC power input from the drive inverter 2b or the power generation inverter 2c and outputting a resultant DC power to the battery P via the pair of battery terminals. That is, the step-up and down converter 2a is a power conversion circuit that bidirectionally inputs or outputs the DC power between the battery P and the drive inverter 2b or the power generation inverter 2c.

The drive inverter 2b converts the DC power output from the battery P into AC power on the basis of a pulse width modulation (PWM) signal from the power converter control unit 3 and supplies the AC power to the motor M. Further, the drive inverter 2b converts the AC power output from the motor M into DC power on the basis of the PWM signal from the power converter control unit 3 and supplies the DC power to the step-up and down converter 2a. Such a drive inverter 2b includes three switching legs and includes a total of six drive IGBTs, as illustrated in FIG. 1.

Such a drive inverter 2b includes the three (a plurality of) switching legs corresponding to the number of phases of the motor M. The drive inverter 2b is a power conversion circuit that selectively performs a power running operation and a regenerative operation. That is, the drive inverter 2b selectively performs a power running operation for converting the DC power input from the step-up and down converter 2a into three-phase AC power and outputting the three-phase AC power to the motor M via three motor terminals, and a regenerative operation for converting the three-phase AC power input from the motor M via the three motor terminals into DC power and outputting the DC power to the step-up and down converter 2a. That is, the drive inverter 2b is a power circuit that mutually converts the DC power and the three-phase AC power between the step-up and down converter 2a and the motor M.

The power generation inverter 2c converts AC power output from a generator G into DC power on the basis of the PWM signal from the power converter control unit 3 and supplies the DC power to the step-up and down converter 2a. Such a power generation inverter 2c also includes three switching legs and includes a total of six drive IGBTs, like the drive inverter 2b.

Such a power generation inverter 2c includes the three (a plurality of) switching legs corresponding to the number of phases of the generator G. The power generation inverter 2c is a power conversion circuit that converts the three-phase AC power input from the generator G via three generator terminals into DC power and outputs the DC power to the step-up and down converter 2a. That is, the power generation inverter 2c is a power circuit that mutually converts the DC power and the three-phase AC power between the step-up and down converter 2a and the generator G.

As illustrated in FIG. 1, the battery P, the motor M, and the generator G are connected to such a power converter 2. The power converter 2 includes a pair of battery terminals (a positive battery terminal E1 and a negative battery terminal E2) to which the battery P is connected, as external connection terminals. Further, the power converter 2 includes the three motor terminals (a U-phase motor terminal Fu, a V-phase motor terminal Fv, and a W-phase motor terminal Fw) to which the motor M is connected. Further, the power converter 2 includes the three generator terminals (a U-phase generator terminal Hu, a V-phase generator terminal Hv, and a W-phase generator terminal Hw) to which the generator G is connected.

The control device 1 including such a power converter 2 is an electric device included in an electric vehicle such as a hybrid car or an electric car, and controls the motor M that is a rotary electric machine and also controls charging of the battery P with AC power generated in the generator G. That is, this control device 1 performs drive control for the motor M based on an output of the battery P (battery power) and charge control for the battery P based on output power (generated power) of the generator G.

The control device 1 may have a configuration in which the power generation inverter 2c is not included in the power converter 2, and the generator G is not connected to the power converter 2. In this case, the control device 1 does not perform the charge control for the battery P based on the output power (the generated power) of the generator G but performs the drive control for the motor M based on the output of the battery P (battery power).

Here, in the battery P, a positive electrode is connected to the positive battery terminal E1, and a negative electrode is connected to the negative battery terminal E2, as illustrated in FIG. 1. This battery P is a secondary battery such as a lithium ion battery and performs discharging of DC power to the control device 1 and charging of DC power via the control device 1.

The motor M is a three-phase motor having "3" phases and is a load of the drive inverter 2b. In this motor M, a U-phase input terminal is connected to the U-phase motor terminal Fu, a V-phase input terminal is connected to the V-phase motor terminal Fv, and a W-phase input terminal is connected to the W-phase motor terminal Fw. In such a motor M, a rotation shaft (a drive shaft) is connected to wheels of an electric vehicle, and the wheels are rotationally driven by causing rotational power to be applied to the wheels.

The generator G is a three-phase generator, and a U-phase output terminal is connected to the U-phase generator terminal Hu, a V-phase output terminal is connected to the V-phase generator terminal Hv, and a W-phase output terminal is connected to the W-phase generator terminal Hw. This generator G is connected to an output shaft of a power source such as an engine mounted on the electric vehicle, and outputs the three-phase AC power to the control device 1.

The power converter control unit 3 includes a gate driver or an electronic control unit (ECU). The gate driver is a circuit that generates a gate signal on the basis of various duty command values (a transformation duty command value, a drive duty command value, and a power generation duty command value) input from the ECU. For example, the gate driver generates a gate signal to be supplied to the step-up and down converter 2a on the basis of the transformation duty command value input from the ECU. Further, the gate driver generates a gate signal to be supplied to the drive inverter 2b on the basis of the drive duty command value input from the ECU. Further, the gate driver generates a gate signal to be supplied to the power generation inverter 2c on the basis of the power generation duty command value input from the ECU.

The ECU is a control circuit that performs predetermined control processing on the basis of a control program stored in advance. This ECU outputs various duty command values (the transformation duty command value, the drive duty command value, and the power generation duty command value) generated on the basis of the control processing to the gate driver. Such an ECU performs the drive control for the motor M and the charge control for the battery P via the power converter 2 and the gate driver. That is, this ECU generates various duty command values (the transformation duty command value, the drive duty command value, and the power generation duty command value) regarding the step-up and down converter 2a, the drive inverter 2b, and the power generation inverter 2c on the basis of a detection value (a voltage detection value) of a voltage sensor incidentally provided on the step-up and down converter 2a, the drive inverter 2b, and the power generation inverter 2c, a detection value (a current detection value) of a current sensor incidentally provided on the step-up and down converter 2a, the drive inverter 2b, and the power generation inverter 2c, and operation information of the electric vehicle.

Figure 2:
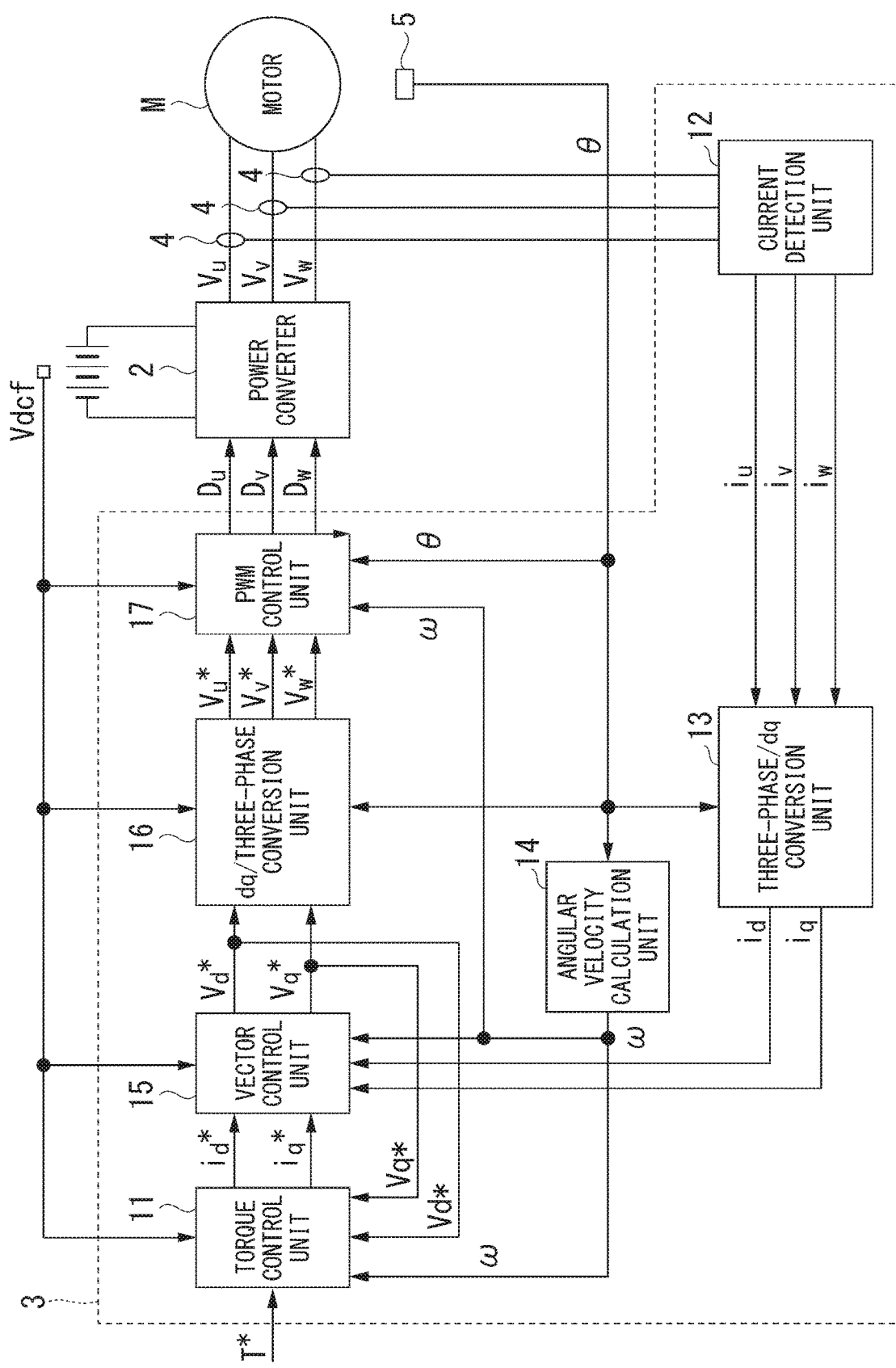
FIG. 2 is a block diagram illustrating a functional configuration of a power converter control unit as the motor control device.

FIG. 2 is a block diagram illustrating a functional configuration of the power converter control unit 3 as a motor control device. The control device 1 includes current sensors 4 and a rotation angle sensor 5, in addition to the power converter 2 and the power converter control unit 3, as illustrated in FIG. 2.

The current sensors 4 detect respective phase currents between the motor M and the power converter 2 and output a result of the detection to the power converter control unit 3. The plurality of current sensors 4 may be provided between the power converter 2 and the motor M or may be provided inside the power converter 2. The current sensors 4 are not particularly limited as long as the current sensors are configured to detect phase currents of respective phases, but include, for example, a current transformer (CT) including a transformer, or a Hall element. Further, the current sensor 4 may be a shunt resistor.

The rotation angle sensor 5 detects a rotation angle of the motor M. The rotation angle of the motor M is an electric angle of the rotor from a predetermined reference rotation position. The rotation angle sensor 5 outputs a detection signal indicating the detected rotation angle to the power converter control unit 3. For example, the rotation angle sensor 5 may include a resolver. The rotation speed of the motor M (a motor rotation speed) can be calculated on the basis of the detection signal output from the rotation angle sensor 5. That is, the rotation angle sensor 5 outputs a detection signal including the motor rotation speed as information.

The power converter control unit 3 includes, for example, a torque control unit 11, a current detection unit 12, a three-phase/dq conversion unit 13, an angular velocity calculation unit 14, a vector control unit 15, a dq/three-phase conversion unit 16, and a PWM control unit 17 as functional units embodied by the above-described gate driver, ECU, or the like. As illustrated in FIG. 2, a DC voltage Vdcf of the battery is input to the torque control unit 11, the vector control unit 15, the dq/three-phase conversion unit 16, and the PWM control unit 17.

The torque control unit 11 acquires a torque command value T* from the outside. The torque control unit 11 generates a d-axis current command value $i_d^*$ that is a target value of the d-axis current of the motor M, and a q-axis current command value $i_q^*$ that is a target value of the q-axis current of the motor M on the basis of on the torque command value T*. Further, the torque control unit 11 outputs the generated d-axis current command value $i_d^*$ and q-axis current command value $i_q^*$ to the vector control unit 15.

The current detection unit 12 detects a value of current flowing through a U-phase coil in the motor M (hereinafter referred to as a "U-phase current value $i_u$"), a value of current flowing through a V-phase coil in the motor M (hereinafter referred to as a "V-phase current value $i_v$"), and a value of current flowing through a W-phase coil in the motor M (hereinafter referred to as a "W-phase current value $i_w$") from detection results of the respective current sensors 4. The current detection unit 12 outputs the detected U-phase current value $i_u$, V-phase current value $i_v$, and W-phase current value $i_w$ to the three-phase/dq conversion unit 13.

The three-phase/dq conversion unit 13 converts the U-phase current value $i_u$, the V-phase current value $i_v$, and the W-phase current value $i_w$ acquired from the current detection unit 12 into a d-axis current detection value $i_d$ and a q-axis current detection value $i_q$ of a dq coordinate system using an electric angle θ acquired from the rotation angle sensor 5. The three-phase/dq conversion unit 13 outputs the d-axis current detection value $i_d$ and the q-axis current detection value $i_q$ to the vector control unit 15.

The angular velocity calculation unit 14 calculates the angular velocity ω on the basis of the electric angle θ of the motor M output from the rotation angle sensor 5. The angular velocity calculation unit 14 outputs the calculated angular velocity ω to the vector control unit 15.

The vector control unit 15 calculates the d-axis voltage command value $v_d^*$ on the basis of a d-axis current command value $i_d^*$. The vector control unit 15 calculates a q-axis voltage command value $v_q^*$ on the basis of the q-axis current command value $i_q^*$. The vector control unit 15 outputs the d-axis voltage command value $v_d^*$ and the q-axis voltage command value $v_q^*$ to the dq/three-phase conversion unit 16. Details of the vector control unit 15 will be described below.

The dq/three-phase conversion unit 16 acquires the electric angle θ from the rotation angle sensor 5. The dq/three-phase conversion unit 16 acquires the d-axis voltage command value $v_d^*$ and the q-axis voltage command value $v_q^*$ from the vector control unit 15. The dq/three-phase conversion unit 16 converts the d-axis voltage command value $v_d^*$ and the q-axis voltage command value $v_q^*$ into a U-phase voltage command value $V_u^*$, a V-phase voltage command value $V_v^*$, and a W-phase voltage command value $V_w^*$ that are voltage command values of respective UVW phases in the motor M using the electric angle θ. The dq/three-phase conversion unit 16 outputs the U-phase voltage command value $V_u^*$, the V-phase voltage command value $V_v^*$, and the W-phase voltage command value $V_w^*$ to the PWM control unit 17. The U-phase voltage command value $V_u^*$, the V-phase voltage command value $V_v^*$, and the W-phase voltage command value $V_w^*$ are modulated waves and may be referred to as a "voltage command signal" when the phase voltage command value is not distinguished from each other.

The PWM control unit 17 compares a carrier wave having a predetermined carrier frequency with the voltage command signal. As a result of the comparison, the PWM control unit 17 outputs a Hi level signal during a period in which an amplitude of the voltage command signal is larger than that of the carrier wave, and outputs a Lo level signal during a period in which the amplitude of the voltage command signal is smaller than that of the carrier wave, to output the PWM signal to the power converter 2. The PWM control unit 17 compares the carrier wave with the U-phase voltage command value $V_u^*$ to generate a PWM signal Du and outputs the PWM signal Du to the power converter 2. The PWM control unit 17 compares the carrier wave with the V-phase voltage command value $V_v^*$ to generate a PWM signal Dv and outputs the PWM signal Dv to the power converter 2. The PWM control unit 17 compares the carrier wave with the W-phase voltage command value Vw* to generate a PWM signal Dw and outputs the PWM signal Dw to the power converter 2.

The power converter 2 is driven on the basis of the PWM signals (the above-described PWM signal Du, PWM signal Dv, and PWM signal Dw) input from the PWM control unit 17 so that rotation of the motor M is controlled.

Next, details of the vector control unit 15 will be described. Here, first, a concept of vector control performed by the vector control unit 15 will be described. When non-interference control is performed in addition to current control in the vector control, voltage equations can be expressed as Equations (1) to (7) below. In Equations (1) to (7), $v_d$ indicates the d-axis voltage, $v_q$ indicates the q-axis voltage, $R_a$ indicates armature resistance, $L_d$ indicates the d-axis inductance, $L_q$ indicates the q-axis inductance, $i_d$ indicates the d-axis current, $i_q$ indicates the q-axis current, $\omega_e$ indicates the angular velocity, $\Phi_a$ indicates an interlinkage magnetic flux, $\Phi_{odd}$ indicates a d-axis variable magnetic flux that is a magnetic flux generated according to the d-axis current, $\Phi_{oq}$ indicates the q-axis interlinkage magnetic flux, and $\Phi_{od}$ indicates the d-axis interlinkage magnetic flux.

$$v_d = (R_a + pL_d)i_d - \omega_e(L_q i_q) \quad (1)$$

$$v_q = (R_a + pL_q)i_q + \omega_e(L_d i_d + \Phi_a) \quad (2)$$

$$\Phi_{od} = \Phi_{odd} + \Phi_a = L_d i_d + \Phi_a \quad (3)$$

$$\Phi_{oq} = L_q i_q \quad (4)$$

$$I_a = \sqrt{i_d^2 + i_q^2} \quad (5)$$

$$V_a = \sqrt{v_d^2 + v_q^2} \quad (6)$$

$$\Phi_a = \sqrt{\Phi_{od}^2 + \Phi_{oq}^2} \quad (7)$$

Further, a disturbance component generated in the power converter 2 when the motor M is in a specific rotation range such as a high rotation range is considered. Here, the disturbance component generated in the specific rotation range is included in an inductance (d-axis inductance and q-axis inductance). These disturbance components are divided into steady variation components ($\Delta L_d$ and $\Delta L_q$) and temporal variation components ($p\Delta L_d$ and $p\Delta L_q$) and are defined as shown in Equations (8) and (9) below.

$$L_d \Rightarrow L_d + (\Delta L_d + p\Delta L_d) \quad (8)$$

$$L_q \Rightarrow L_q + (\Delta L_q + p\Delta L_q) \quad (9)$$

Then, Equations (10) to (15) below are established on the basis of Equations (1) to (9).

$$v_d = [R_a + p\{L_d + (\Delta L_d + p\Delta L_d)\}]i_d + (-\omega_e)\{L_q + (\Delta L_q + p\Delta L_q)\}i_q \quad (10)$$

$$[R_a + p\{L_d + (\Delta L_d + p\Delta L_d)\}]i_d = \quad (11)$$

$$R_a i_d + L_d \frac{di_d}{dt} + \Delta L_d \frac{di_d}{dt} + \Delta L_d \frac{d^2}{dt^2} i_d \approx R_a i_d + L_d \frac{di_d}{dt}$$

$$\Phi_{oq} = L_q i_q \Rightarrow \{L_q + (\Delta L_q + p\Delta L_q)\}i_q = \quad (12)$$

$$L_q i_q + \Delta L_q i_q + \Delta L_q \frac{di_q}{dt} \approx L_q i_q + \Delta L_q i_q$$

$$v_q = [R_a + p\{L_q + (\Delta L_q + p\Delta L_q)\}]i_q + \omega_e[\{L_d + (\Delta L_d + p\Delta L_d)\}i_d + \Phi_a] \quad (13)$$

$$[R_a + p\{L_q + (\Delta L_q + p\Delta L_q)\}]i_q = \quad (14)$$

$$R_a i_q + L_q \frac{di_q}{dt} + \Delta L_q \frac{di_q}{dt} + \Delta L_q \frac{d^2}{dt^2} i_q \approx R_a i_q + L_d \frac{di_d}{dt}$$

$$\Phi_{od} = L_d i_d + \Phi_a \Rightarrow \{L_d + (\Delta L_d + p\Delta L_d)\}i_d + \Phi_a = \quad (15)$$

$$L_d i_d + \Delta L_d i_d + \Delta L_d \frac{di_d}{dt} + \Phi_a \approx L_d i_d + \Delta L_d i_d + \Phi_a$$

Here, it is assumed that variation amounts of terms shown in Equations (16) to (21) is very small, as shown in Equations (16) to (21) below.

$$\Delta L_d \frac{di_d}{dt} \approx 0 \quad (16)$$

$$\Delta L_d \frac{d^2}{dt^2} i_d \approx 0 \quad (17)$$

$$\Delta L_q \frac{di_q}{dt} \approx 0 \quad (18)$$

-continued $$\Delta L_q \frac{di_q}{dt} \approx 0 \quad (19)$$

$$\Delta L_q \frac{d^2}{dt^2} i_q \approx 0 \quad (20)$$

$$\Delta L_d \frac{di_d}{dt} \approx 0 \quad (21)$$

When the terms shown in Equations (16) to (21) are deleted, voltage equations can be expressed as Equations (22) and (23) below.

$$v_d = (R_a + p\ L_d)i_d + (-\omega_e)L_q i_q + \Delta L_q i_q \quad (22)$$

$$v_q = (R_a + p\ L_q)i_q + \omega_e(L_d i_d + \Phi_a) + \omega_e \Delta L_d i_d \quad (23)$$

Further, when Equations (24) to (26) below are defined, Equation (22) can be expressed as Equation (27) below.

$$(R_a + p\ L_d)i_d = v_{dcUr} \quad (24)$$

$$(-\omega_e)L_q i_q = v_{ddcp} \quad (25)$$

$$(-\omega_e)\Delta L_q i_q = \Delta v_{ddcp} \quad (26)$$

$$v_d = (R_a + pL_d)i_d + (-\omega_e)L_q i_q + (-\omega_e)\Delta L_q i_q = v_{dcur} + v_{ddcp} + \Delta v_{ddcp} \quad (27)$$

In Equation (22), a first term on the left side is a term indicating a component that causes the d-axis current to follow the d-axis current command value. Therefore, $v_{dcur}$ in Equation (24) indicates a component for performing d-axis current follow-up control. Hereinafter, $v_{dcur}$ is referred to as a d-axis current follow-up component. Further, in Equation (22), a second term on the left side is a term indicating an interference component generated by an influence of the q-axis current. Further, in Equation (22), a third term on the left side is a term indicating the interference component generated by the influence of the q-axis current in a specific rotation range (for example, a high-speed rotation range) of the motor M. Therefore, $v_{ddcp}$ and $\Delta v_{ddcp}$ in Equations (25) and (26) indicate noise components included in the d-axis voltage due to interference of the q-axis current with the d-axis current. Hereinafter, $v_{ddcp}$ is referred to as a first d-axis interference component. Further, $\Delta v_{ddcp}$ is referred to as a second d-axis interference component.

Further, when Equations (28) to (30) below are defined, Equation (23) can be expressed as Equation (31) below.

$$(R_a + pL_q)i_q = v_{qcur} \quad (28)$$

$$\omega_e(L_d i_d + \Phi_a) = v_{qdcp} \quad (29)$$

$$\omega_e \Delta L_d i_d = \Delta v_{qdcp} \quad (30)$$

$$v_q = (R_a + pL_q)i_q + \omega_e(L_d i_d + \Phi_a) + \omega_e(\Delta L_d i_d = v_{qcur} + v_{qdcp} + \Delta v_{qdcp} \quad (31)$$

In Equation (23), a first term on the left side is a term indicating a component that causes the q-axis current to follow the q-axis current command value. Therefore, $v_{qcur}$ in Equation (28) indicates a component for performing q-axis current follow-up control. Hereinafter, $v_{qcur}$ is referred to as a q-axis current follow-up component. Further, in Equation (23), a second term on the left side is a term indicating an interference component generated by an influence of the d-axis current. Further, in Equation (23), a third term on the left side is a term indicating the interference component generated by the influence of the d-axis current in the specific rotation range (for example, the high-speed rotation range) of the motor M. Therefore, $v_{qdcp}$ and $\Delta v_{qdcp}$ in Equations (29) and (30) indicate noise components included in the q-axis voltage due to an interference of the d-axis current with the q-axis current. Hereinafter, $v_{qdcp}$ is referred to as a first q-axis interference component. Further, $\Delta v_{qdcp}$ is referred to as a second q-axis interference component.

In the present embodiment, the vector control unit 15 includes a current control unit 50, which will be described below, in which a current follow-up component (the d-axis current follow-up component $v_{dcur}$ and the q-axis current follow-up component $v_{qcur}$) is set as a control target on the basis of the voltage equation described above. Further, the vector control unit 15 includes a first non-interference control unit 60, which will be described below, in which a first interference component (the first d-axis interference component $v_{ddcp}$ and a first q-axis interference component $v_{qdcp}$) that is a noise component is set as a control target. Further, the vector control unit 15 includes a second non-interference control unit 70, which will be described below, in which a second interference component (the second d-axis interference component $\Delta v_{ddcp}$ and the second q-axis interference component $\Delta v_{qdcp}$) that is a noise component is set as a control target.

Figure 3:
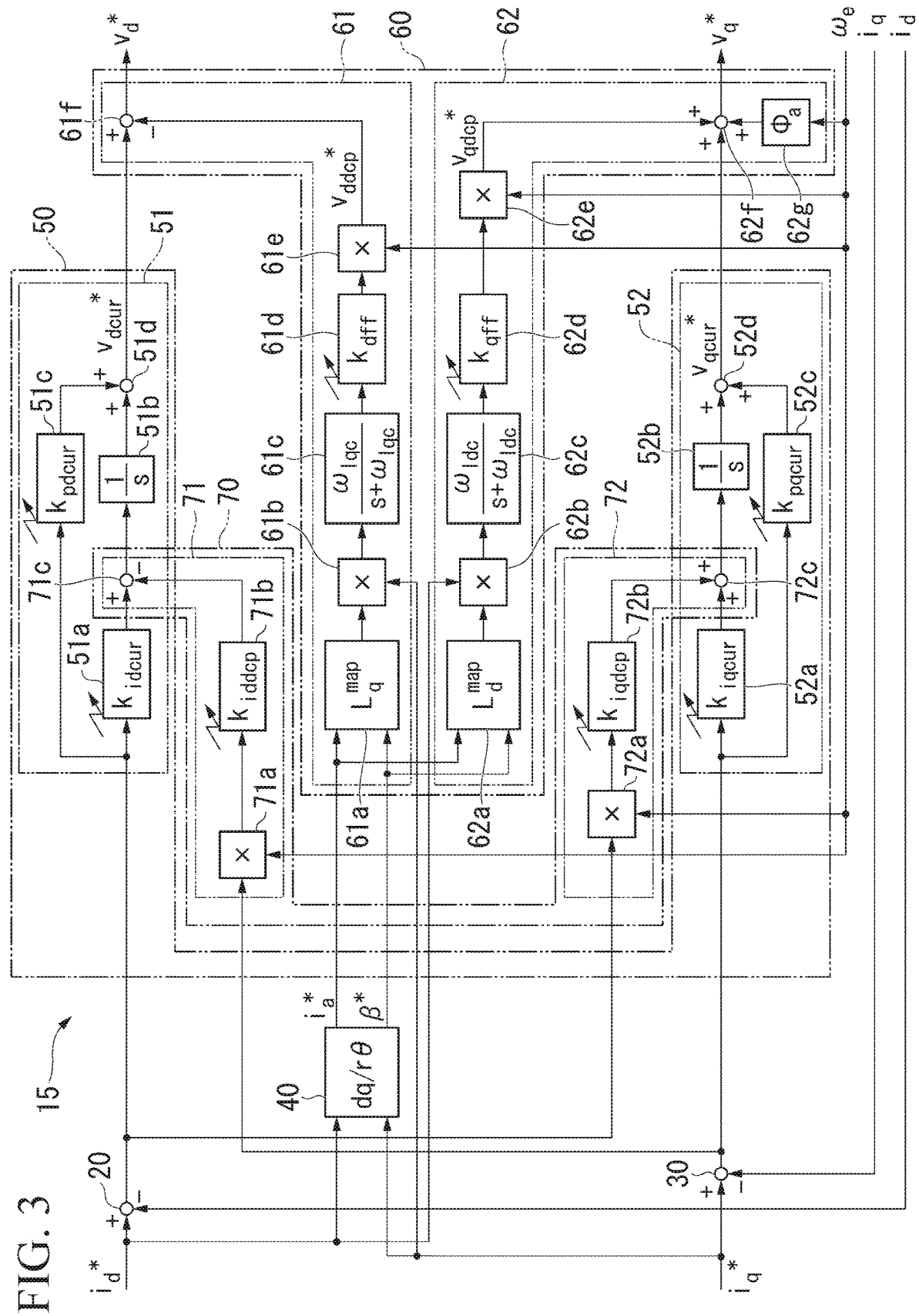
FIG. 3 is a block diagram of a vector control unit included in the motor control device according to the embodiment of the present invention.

FIG. 3 is a block diagram illustrating a schematic configuration of the vector control unit 15. As illustrated in this figure, the vector control unit 15 includes a first subtractor 20, a second subtractor 30, a calculation unit 40, the current control unit 50, the first non-interference control unit 60, and the second non-interference control unit 70.

The first subtractor 20 acquires the d-axis current command value $i_d^*$ from the torque control unit 11. The first subtractor 20 acquires the d-axis current detection value $i_d$ from the three-phase/dq conversion unit 13. The first subtractor 20 subtracts the d-axis current detection value $i_d$ from the d-axis current command value $i_d^*$ to obtain a deviation. The first subtractor 20 outputs the obtained deviation to the current control unit 50.

The second subtractor 30 acquires the q-axis current command value $i_q^*$ from the torque control unit 11. The second subtractor 30 acquires the q-axis current detection value $i_q$ from the three-phase/dq conversion unit 13. The second subtractor 30 subtracts the q-axis current detection value $i_q$ from the q-axis current command value $i_q^*$ to obtain a deviation. The second subtractor 30 outputs the obtained deviation to the current control unit 50.

The calculation unit 40 acquires the d-axis current command value $i_d^*$ and the q-axis current command value $i_q^*$ from the torque control unit 11. The calculation unit 40 calculates a current amplitude command value $i_a^*$ that is a command value of an amplitude $i_a$ of a motor current $i_m$ that is a current flowing through the motor M, and a current phase command value $\beta^*$ that is a command value of a current phase $\beta$ that is a phase of the motor current $i_m$ on the basis of the d-axis current command value $i_d^*$ and the q-axis current command value $i_q^*$. Here, the motor current $i_m$ is a vector obtained by combining a vector of the d-axis current command value $i_d^*$ with a vector of the q-axis current command value $i_q^*$ and is also called a motor current vector. Therefore, the amplitude $i_a$ is an absolute value of the motor current vector. The current phase $\beta$ is the phase of the motor current $i_m$ (the motor current vector) with respect to the q-axis or the d-axis.

The current control unit 50 calculates a before-compensation d-axis voltage command value $v_{dcur}^*$ based on the d-axis current command value $i_d^*$ and the d-axis current detection value $i_d$, and a before-compensation q-axis voltage command value $v_{qcur}^*$ based on the q-axis current command value $i_q^*$ and the q-axis current detection value $i_q$. The current control unit 50 performs PI control to calculate the before-compensation d-axis voltage command value $v_{dcur}*$ and the before-compensation q-axis voltage command value $v_{qcur}*$ for controlling the current follow-up component (the d-axis current follow-up component $v_{dcur}$ and the q-axis current follow-up component $v_{qcur}$) shown in the voltage equation.

As illustrated in FIG. 3, the current control unit 50 includes a d-axis current control unit 51 and a q-axis current control unit 52. The d-axis current control unit 51 calculates the before-compensation d-axis voltage command value $v_{dcur}*$ based on the d-axis current command value $i_d*$ and the d-axis current detection value $i_d$. The q-axis current control unit 52 calculates the before-compensation q-axis voltage command value $v_{qcur}*$ based on the q-axis current command value $i_q*$ and the q-axis current detection value $i_q$.

The d-axis current control unit 51 is a functional unit that performs PI control to calculate the before-compensation d-axis voltage command value $v_{dcur}*$ and includes a d-axis integral gain multiplication unit 51a, a d-axis integrator 51b, and a d-axis proportional gain multiplication unit 51c, and an adder 51d.

The d-axis integral gain multiplication unit 51a multiplies the deviation (the deviation between the d-axis current command value $i_d*$ and the d-axis current detection value $i_d$) output from the first subtractor 20 by an integral gain $k_{idcur}$, and outputs a result of the multiplication to the d-axis integrator 51b.

The d-axis integrator 51b integrates an output from the d-axis integral gain multiplication unit 51a. In the present embodiment, a subtractor 71c of the second non-interference control unit 70, which will be described below, is installed between the d-axis integral gain multiplication unit 51a and the d-axis integrator 51b. The subtractor 71c subtracts an output from the d-axis variable integral gain multiplication unit 71b, which will be described below, from an output from the d-axis integral gain multiplication unit 51a. Therefore, the d-axis integrator 51b integrates a value obtained by subtracting the output from the d-axis variable integral gain multiplication unit 71b from the output from the d-axis integral gain multiplication unit 51a (an output from the subtractor 71c).

The d-axis proportional gain multiplication unit 51c multiplies the deviation output from the first subtractor 20 by a proportional gain $k_{pdcur}$ and outputs a result of the multiplication. The adder 51d adds an integral value from the d-axis integrator 51b to an output from the d-axis proportional gain multiplication unit 51c to calculate the before-compensation d-axis voltage command value $v_{dcur}*$.

The q-axis current control unit 52 is a functional unit that performs PI control to calculate the before-compensation q-axis voltage command value $v_{qcur}*$ and includes a q-axis integral gain multiplication unit 52a, a q-axis integrator 52b, and a q-axis proportional gain multiplication unit 52c, and an adder 52d.

The q-axis integral gain multiplication unit 52a multiplies the deviation (the deviation between the q-axis current command value $i_q*$ and the q-axis current detection value $i_q$) output from the second subtractor 30 by the integral gain $k_{iqcur}$, and outputs a result of the multiplication to the q-axis integrator 52b.

The q-axis integrator 52b integrates an output from the q-axis integral gain multiplication unit 52a. In the present embodiment, an adder 72c of the second non-interference control unit 70, which will be described below, is installed between the q-axis integral gain multiplication unit 52a and the q-axis integrator 52b. The adder 72c adds an output from a q-axis variable integral gain multiplication unit 72b, which will be described below, to the output from the q-axis integral gain multiplication unit 52a. Therefore, the q-axis integrator 52b integrates a value (an output from the adder 72c) obtained by adding the output from the q-axis variable integral gain multiplication unit 72b to the output from the q-axis integral gain multiplication unit 52a.

The q-axis proportional gain multiplication unit 52c multiplies the deviation output from the second subtractor 30 by a proportional gain $k_{pqcur}$ and outputs a result of the multiplication. The adder 52d adds an integral value from the q-axis integrator 52b to an output from the q-axis proportional gain multiplication unit 52c to calculate the before-compensation q-axis voltage command value $v_{qcur}*$.

The first non-interference control unit 60 calculates the first d-axis non-interference compensation value $v_{ddcp}*$ on the basis of the q-axis current command value $i_q*$ to compensate for the before-compensation d-axis voltage command value $v_{dcur}*$ and calculates a first q-axis non-interference compensation value $v_{qdcp}*$ on the basis of the d-axis current command value $i_d*$ to compensate for the before-compensation q-axis voltage command value $v_{qcur}*$. Further, the first non-interference control unit 60 calculates the first d-axis non-interference compensation value $v_{ddcp}*$ and the first q-axis non-interference compensation value $v_{qdcp}*$ using a first non-interference gain (a first d-axis non-interference gain $k_{dff}$ and a first q-axis non-interference gain $k_{qff}$) varying depending on the motor rotation speed. Further, the first non-interference control unit 60 sets the first non-interference gain on the basis of a first non-interference gain map (a first d-axis non-interference gain map $k_{dff}^{map}$ and a first q-axis non-interference gain map $k_{qff}^{map}$) in which the motor rotation speed $N_f$ (that is, the angular velocity ω) and the first non-interference gain are associated with each other.

The first non-interference control unit 60 subtracts the first d-axis non-interference compensation value $v_{ddcp}*$ from the before-compensation d-axis voltage command value $v_{dcur}*$ to multiply the d-axis voltage command value $v_d*$ by a component for canceling out the first interference component (the first d-axis interference component $v_{ddcp}$) shown in the voltage equation described above. The first non-interference control unit 60 subtracts the first q-axis non-interference compensation value $v_{qdcp}*$ from the before-compensation q-axis voltage command value $v_{qcur}*$ to multiply the q-axis voltage command value $v_q*$ by a component for canceling out the first interference component (the first q-axis interference component $v_{qdcp}$) shown in the voltage equation described above.

As illustrated in FIG. 3, the first non-interference control unit 60 includes a first d-axis non-interference control unit 61 and a first q-axis non-interference control unit 62. The first d-axis non-interference control unit 61 calculates the first d-axis non-interference compensation value $v_{ddcp}*$ on the basis of the q-axis current command value $i_q*$ to compensates for the before-compensation d-axis voltage command value $v_{dcur}*$. Further, the first q-axis non-interference control unit 62 calculates the first q-axis non-interference compensation value $v_{qdcp}*$ on the basis of the d-axis current command value $i_d*$ to compensate for the before-compensation q-axis voltage command value $v_{qcur}*$ The first d-axis non-interference control unit 61 includes a q-axis inductance calculation unit 61a, a multiplier 61b, a low pass filter 61c, a first d-axis non-interference gain multiplication unit 61d, a multiplier 61e, and a subtractor 61f.

The q-axis inductance calculation unit 61a obtains a q-axis inductance $L_q$ according to the current amplitude command value $i_a^*$ and the current phase command value $\beta^*$ obtained by the calculation unit 40. The q-axis inductance $L_q$ is an inductance on the q-axis side in the motor M. Specifically, a q-axis inductance map $L_q^{map}$ that is information indicating a correspondence relationship between the amplitude $i_a$ and the current phase $\beta$ of the motor current $i_m$ and the q-axis inductance $L_q$ are stored in the q-axis inductance calculation unit 61a in advance. The q-axis inductance map $L_q^{map}$ may be experimentally or theoretically determined so that the q-axis inductance $L_q$ can be determined on the basis of the amplitude $i_a$ and the current phase $\beta$. For example, the q-axis inductance map $L_q^{map}$ may be a table having each amplitude $i_a$, each current phase $\beta$, and the q-axis inductance $L_q$ associated with each combination of the amplitude $i_a$ and the current phase $\beta$. However, the q-axis inductance map $L_q^{map}$ is not limited thereto and may be information indicating the correspondence relationship between the amplitude $i_a$ and the current phase $\beta$ of the motor current $i_m$ and the q-axis inductance $L_q$ or may be an equation other than the table.

The q-axis inductance calculation unit 61a acquires the current amplitude command value $i_a^*$ and the current phase command value $\beta^*$ from the calculation unit 40. The q-axis inductance calculation unit 61a refers to the q-axis inductance map $L_q^{map}$ to acquire the q-axis inductance $L_q$ corresponding to the amplitude $i_a$ equivalent to the current amplitude command value $i_a^*$ and the current phase $\beta$ equivalent to the current phase command value $\beta^*$ from the q-axis inductance map $L_q^{map}$. The q-axis inductance calculation unit 61a outputs the q-axis inductance $L_q$ acquired from the q-axis inductance map $L_q^{map}$ to the multiplier 61b.

The multiplier 61b multiplies the q-axis inductance $L_q$ output from the q-axis inductance calculation unit 61a by the q-axis current command value $i_q^*$ and outputs a result of the multiplication. The low pass filter 61c attenuates a high frequency component of a signal output from the multiplier 61b and outputs a resultant signal to the first d-axis non-interference gain multiplication unit 61d. $\omega_{lqc}$ shown in FIG. 3 indicates a center frequency in the low pass filter 61c.

Figure 4:
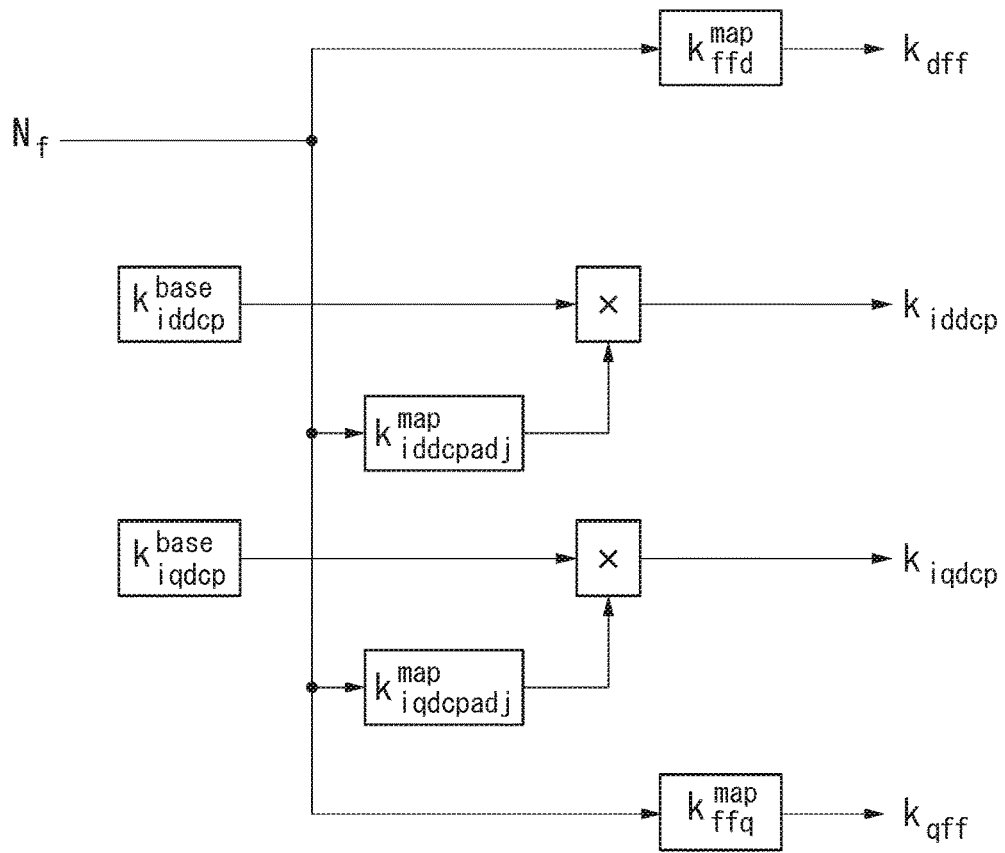
FIG. 4 is a block diagram illustrating a method of calculating a first d-axis non-interference gain, a first q-axis non-interference gain, a d-axis variable integral gain, and a q-axis variable integral gain.

The first d-axis non-interference gain multiplication unit 61d multiplies an output of the low pass filter 61c by the first d-axis non-interference gain $k_{dff}$ and outputs a result of the multiplication. The first d-axis non-interference gain $k_{dff}$ varies depending on the motor rotation speed $N_f$ (that is, the angular velocity $\omega$). FIG. 4 is a block diagram illustrating a method of calculating the first d-axis non-interference gain $k_{dff}$ and the like. As illustrated in this figure, the first d-axis non-interference gain multiplication unit 61d stores the first d-axis non-interference gain map $k_{dff}^{map}$ indicating a relationship between the motor rotation speed $N_f$ (or the angular velocity $\omega$) and the first d-axis non-interference gain $k_{dff}$ in advance and sets the first d-axis non-interference gain $k_{dff}$ on the basis of the first d-axis non-interference gain map $k_{dff}^{map}$.

The multiplier 61e multiplies an output from the first d-axis non-interference gain multiplication unit 61d by an input value (an input angular velocity $\omega_e$) from the angular velocity calculation unit to calculate the first d-axis non-interference compensation value $v_{ddcp}^*$ and outputs the first d-axis non-interference compensation value $v_{ddcp}^*$.

The subtractor 61f subtracts the first d-axis non-interference compensation value $v_{ddcp}^*$ output from the multiplier 61e from the before-compensation d-axis voltage command value $v_{dcur}^*$ output from the d-axis current control unit 51 to calculate the d-axis voltage command value $v_d^*$ and outputs the d-axis voltage command value $v_d^*$.

The first q-axis non-interference control unit 62 includes a d-axis inductance calculation unit 62a, a multiplier 62b, a low pass filter 62c, a first q-axis non-interference gain multiplication unit 62d, a multiplier 62e, and an adder 62f, and an interlinkage magnetic flux calculation unit 62g.

The d-axis inductance calculation unit 62a obtains a d-axis inductance $L_d$ according to the current amplitude command value $i_a^*$ and the current phase command value $\beta^*$ obtained by the calculation unit 40. The d-axis inductance La is an inductance on the d-axis side of the motor M. Specifically, a d-axis inductance map $L_{dmap}$ that is information indicating a correspondence relationship between the amplitude $i_a$ and the current phase $\beta$ of the motor current $i_m$ and the d-axis inductance $L_d$ is stored in the d-axis inductance calculation unit 62a in advance. The d-axis inductance map $L_d^{map}$ may be experimentally or theoretically determined so that the d-axis inductance $L_d$ can be determined on the basis of the amplitude $i_a$ and the current phase $\beta$. For example, the d-axis inductance map $L_d^{map}$ may be a table having each amplitude $i_a$, each current phase $\beta$, and the d-axis inductance $L_d$ associated with each combination of the amplitude $i_a$ and the current phase $\beta$. However, the d-axis inductance map $L_d^{map}$ is not limited thereto and may be information indicating the correspondence relationship between the amplitude $i_a$ and the current phase $\beta$ of the motor current $i_m$ and the d-axis inductance $L_d$ or may be an equation other than the table.

The d-axis inductance calculation unit 62a acquires the current amplitude command value $i_a^*$ and the current phase command value $\beta^*$ from the calculation unit 40. The d-axis inductance calculation unit 62a refers to the d-axis inductance map $L_d^{map}$ to acquire the d-axis inductance $L_d$ corresponding to the amplitude $i_a$ equivalent to the current amplitude command value $i_a^*$ and the current phase $\beta$ equivalent to the current phase command value $\beta^*$ from the d-axis inductance map $L_d^{map}$. The d-axis inductance calculation unit 62a outputs the d-axis inductance $L_d$ acquired from the d-axis inductance map $L_d^{map}$ to the multiplier 62b.

The multiplier 62b multiplies the d-axis inductance $L_d$ output from the d-axis inductance calculation unit 62a by the d-axis current command value $i_d^*$ and outputs a result of the multiplication. The low pass filter 62c attenuates a high frequency component of a signal output from the multiplier 62b and outputs a result of the attenuation to the first q-axis non-interference gain multiplication unit 62d. $\omega_{ldc}$ illustrated in FIG. 3 indicates a center frequency of the low pass filter 62c.

The first d-axis non-interference gain multiplication unit 62d multiplies the output of the low pass filter 62c by the first q-axis non-interference gain $k_{qff}$ and outputs a result of the multiplication. The first q-axis non-interference gain $k_{qff}$ varies depending on the motor rotation speed $N_f$ (that is, the angular velocity $\omega$). As illustrated in FIG. 4, the first q-axis non-interference gain multiplication unit 62d stores the first q-axis non-interference gain map $k_{qff}^{map}$ indicating a relationship between the motor rotation speed $N_f$ (or the angular velocity $\omega$) and the first q-axis non-interference gain $k_{qff}$ in advance and sets the first q-axis non-interference gain $k_{qff}$ on the basis of the first q-axis non-interference gain map $k_{qff}^{map}$.

The multiplier 62e multiplies an output from the first q-axis non-interference gain multiplication unit 62d by an input value (the input angular velocity $\omega_e$) from the angular velocity calculation unit to calculate the first q-axis non-interference compensation value $v_{qdcp}^*$ and outputs the first q-axis non-interference compensation value $v_{qdcp}^*$.

The adder 62f adds the first q-axis non-interference compensation value $v_{qdcp}^*$ output from the multiplier 62e and the interlinkage magnetic flux $\Phi_a$ output from the interlinkage magnetic flux calculation unit 62g to the before-compensation q-axis voltage command value $v_{qcur}^{*}$ output from the q-axis current control unit 52 to calculate and output the q-axis voltage command value $v_q^*$.

The interlinkage magnetic flux calculation unit 62g obtains the interlinkage magnetic flux $\Phi_a$ of the motor M. For example, the interlinkage magnetic flux calculation unit 62g obtains a square root of a value obtained by adding a square of the q-axis interlinkage magnetic flux to a square of the d-axis interlinkage magnetic flux to obtain the interlinkage magnetic flux $\Phi_a$. The interlinkage magnetic flux calculation unit 62g outputs the interlinkage magnetic flux $\Phi_a$ to the adder 62f.

The second non-interference control unit 70 cancels out an interference component (the second d-axis interference component $\Delta v_{ddcp}$) of the d-axis current generated in the specific rotation range of the motor M with the q-axis current, and an interference component (the second q-axis interference component $\Delta v_{qdcp}$) of the q-axis current generated in the specific rotation range of the motor M with the q-axis current by using a variable integral gain (a d-axis variable integral gain $k_{iddcp}$ and a q-axis variable integral gain $k_{iqdcp}$) varying depending on the motor rotation speed $N_f$ (that is, the angular velocity $\omega$). Further, the second non-interference control unit 70 adds or subtracts the variable integral gain to or from the output of the d-axis integral gain multiplication unit 51a and the output of the q-axis integral gain multiplication unit 52a. Further, the second non-interference control unit 70 sets the variable integral gain on the basis of a variable integral gain map (a d-axis variable integral gain adjustment coefficient map $k_{iddcpadj}^{map}$ and a q-axis variable integral gain adjustment coefficient map $k_{iqdcpadj}^{map}$) in which the motor rotation speed $N_f$ and the variable integral gain adjustment coefficient (a d-axis variable integral gain adjustment coefficient $k_{iddcpadj}$ and a q-axis variable integral gain adjustment coefficient $k_{iqdcpadj}$) are associated with each other.

As illustrated in FIG. 3, the second non-interference control unit 70 includes a second d-axis non-interference control unit 71 and a second q-axis non-interference control unit 72. The second d-axis non-interference control unit 71 cancels out the interference component (the second d-axis interference component $\Delta v_{ddcp}$) of the d-axis current generated in the specific rotation range of the motor M with the q-axis current by using the d-axis variable integral gain $k_{iddcp}$ varying depending on the motor rotation speed $N_f$ (that is, the angular velocity $\omega$). Further, the second q-axis non-interference control unit 72 cancels out the interference component (the second q-axis interference component $\Delta v_{qdcp}$) of the q-axis current generated in the specific rotation range of the motor M with the q-axis current by using the q-axis variable integral gain $k_{iqdcp}$ varying depending on the motor rotation speed $N_f$ (that is, the angular velocity $\omega$).

The second d-axis non-interference control unit 71 includes a multiplier 71a, the d-axis variable integral gain multiplication unit 71b, and the subtractor 71c.

The multiplier 71a multiplies the q-axis current command value $i_q^*$ by the input angular velocity $\omega_e$ and outputs a result of the multiplication. The d-axis variable integral gain multiplication unit 71b multiplies an output from the multiplier 71a by the d-axis variable integral gain $k_{iddcp}$ and outputs a result of the multiplication. As illustrated in FIG. 4, for example, the d-axis variable integral gain multiplication unit 71b stores the d-axis variable integral gain adjustment coefficient map $k_{iddcpadj}^{map}$ indicating a relationship between the motor rotation speed $N_f$ (or the input angular velocity $\omega_e$) and the d-axis variable integral gain adjustment coefficient $k_{iddcpadj}$ in advance. The d-axis variable integral gain multiplication unit 71b sets the d-axis variable integral gain adjustment coefficient $k_{iddcpadj}$ from the motor rotation speed $N_f$ (or the input angular velocity $\omega_e$) and multiplies the d-axis variable integral gain $k_{iddcp}^{base}$ by this d-axis variable integral gain adjustment coefficient $k_{iddcpadj}$ to adjust the d-axis variable integral gain $k_{iddcp}$.

Figure 5:
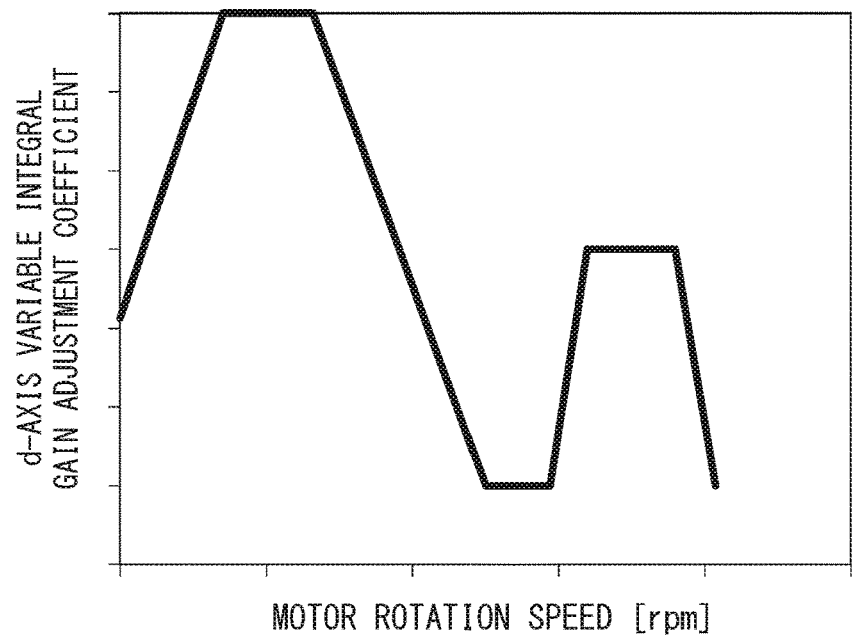
FIG. 5 is a graph illustrating an example of a relationship between a motor rotation speed and a d-axis variable integral gain adjustment coefficient.

FIG. 5 is a graph illustrating an example of a relationship between a motor rotation speed and the d-axis variable integral gain adjustment coefficient. As illustrated in this figure, the relationship between the motor rotation speed and the d-axis variable integral gain adjustment coefficient is defined so that the d-axis variable integral gain adjustment coefficient can be uniquely derived depending on the motor rotation speed. In order to curb sudden change in the d-axis variable integral gain adjustment coefficient due to change in the motor rotation speed, an amount of change (that is, a slope of the graph in FIG. 5) in the d-axis variable integral gain adjustment coefficient per unit change in the motor rotation speed is set not to exceed a predetermined threshold. The motor rotation speed and the d-axis variable integral gain adjustment coefficient are associated with each other so that the motor rotation speed can cancel out the second d-axis interference component $\Delta v_{ddcp}$ generated in the specific rotation range.

The subtractor 71c is disposed between the d-axis integral gain multiplication unit 51a and the d-axis integrator 51b of the d-axis current control unit 51. The subtractor 71c subtracts the output from the d-axis variable integral gain multiplication unit 71b from the output of the d-axis current control unit 51. As a result, the before-compensation d-axis voltage command value $v_{dcur}^*$ output from the d-axis current control unit 51 includes a component for canceling out the second d-axis interference component $\Delta v_{ddcp}$.

In the present embodiment, the output from the d-axis variable integral gain multiplication unit 71b is input between the d-axis integral gain multiplication unit 51a and the d-axis integrator 51b of the d-axis current control unit 51. However, the output from the d-axis variable integral gain multiplication unit 71b may be integrated by an integrator and subtracted from the before-compensation d-axis voltage command value $v_{dcur}^*$ output from the d-axis current control unit 51.

The second q-axis non-interference control unit 72 includes the multiplier 72a, the q-axis variable integral gain multiplication unit 72b, and the adder 72c.

The multiplier 72a multiplies the d-axis current command value $i_d^*$ by the input angular velocity $\omega_e$ and outputs a result of the multiplication. The q-axis variable integral gain multiplication unit 72b multiplies an output from the multiplier 72a by the q-axis variable integral gain $k_{iqdcp}$ and outputs a result of the multiplication. As illustrated in FIG. 4, for example, the q-axis variable integral gain multiplication unit 72b stores the q-axis variable integral gain adjustment coefficient map $k_{iqdcpadj}^{map}$ indicating a relationship between the motor rotation speed $N_f$ (or the input angular velocity $\omega_e$) and q-axis variable integral gain adjustment coefficient $k_{iqdcpadj}$ in advance. The q-axis variable integral gain multiplication unit 72b sets the q-axis variable integral gain adjustment coefficient $k_{iqdcpadj}$ from the motor rotation speed $N_f$ (or the input angular velocity $\omega e$) and multiplies the q-axis variable integral gain $k_{iqdcp}^{base}$ by this q-axis variable integral gain adjustment coefficient $k_{iqdcpadj}$ to adjust the q-axis variable integral gain $k_{iqdcp}$.

A relationship between the motor rotation speed and the q-axis variable integral gain adjustment coefficient is defined so that the q-axis variable integral gain adjustment coefficient can be uniquely derived depending on the motor rotation speed, like the relationship between the motor rotation speed and the d-axis variable integral gain adjustment coefficient. In order to curb sudden change in the q-axis variable integral gain adjustment coefficient due to change in the motor rotation speed, an amount of change in the q-axis variable integral gain adjustment coefficient per unit change in the motor rotation speed is set not to exceed a predetermined threshold value. The motor rotation speed and the q-axis variable integral gain adjustment coefficient are associated with each other so that the motor rotation speed can cancel out the second q-axis interference component $\Delta v_{qdcp}$ generated in the specific rotation range.

The adder 72c is disposed between the q-axis integral gain multiplication unit 52a and the q-axis integrator 52b of the q-axis current control unit 52. The adder 72c adds the output from the q-axis variable integral gain multiplication unit 72b to the output of the q-axis current control unit 52. As a result, the before-compensation q-axis voltage command value $v_{qcur}^*$ output from the q-axis current control unit 52 includes a component for canceling out the second q-axis interference component $\Delta v_{qdcp}$.

In the present embodiment, the output from the q-axis variable integral gain multiplication unit 72b is input between the q-axis integral gain multiplication unit 52a and the q-axis integrator 52b of the q-axis current control unit 52. However, the output from the q-axis variable integral gain multiplication unit 72b may be integrated by an integrator and added to the before-compensation q-axis voltage command value $v_{qcur}^*$ output from the q-axis current control unit 52.

In such a vector control unit 15, when the deviation (the deviation between the d-axis current command value $i_d^*$ and the d-axis current detection value $i_d$) is input from the first subtractor 20 to the d-axis current control unit 51, and the output from the d-axis variable integral gain multiplication unit 71b of the second d-axis non-interference control unit 71 is input, the d-axis current control unit 51 calculates the before-compensation d-axis voltage command value $v_{dcur}^*$. The first d-axis non-interference compensation value $v_{ddcp}^*$ output from the first d-axis non-interference control unit 61 is subtracted from the before-compensation d-axis voltage command value $v_{dcur}^*$, so that the d-axis voltage command value $v_d^*$ including a component for canceling out the first d-axis interference component $v_{ddcp}$ and the component for canceling out the second d-axis interference component $\Delta v_{ddcp}$ is generated.

Further, in the vector control unit 15, when the deviation (the deviation between the q-axis current command value $i_q^*$ and the q-axis current detection value $i_q$) is input from the second subtractor 30 to the q-axis current control unit 52, and the output from the q-axis variable integral gain multiplication unit 72b of the second q-axis non-interference control unit 72 is input, the q-axis current control unit 52 calculates the before-compensation q-axis voltage command value $v_{qcur}^*$. The first q-axis non-interference compensation value $v_{qdcp}^*$ output from the first q-axis non-interference control unit 62 is added to the before-compensation q-axis voltage command value $v_{qcur}^*$, so that the q-axis voltage command value $v_q^*$ including a component for canceling out the first q-axis interference component $v_{qdcp}$ and a component for canceling out the second q-axis interference component $\Delta v_{qdcp}$ is generated.

The motor control device (control device 1) of the present embodiment as described above includes the vector control unit 15 that calculates the d-axis voltage command value $v_d^*$ and the q-axis voltage command value $v_q$ on the basis of the d-axis current command value $i_d^*$ and the q-axis current command value $i_q^*$. The vector control unit 15 includes the current control unit 50 that calculates the before-compensation d-axis voltage command value $v_{dcur}^*$ based on the d-axis current command value $i_d^*$ and the d-axis current detection value $i_d$ and calculates the before-compensation q-axis voltage command value $v_{qcur}^*$ based on the q-axis current command value $i_q^*$ and the q-axis current detection value $i_q$. Further, the vector control unit 15 includes the first non-interference control unit 60 that calculates the first d-axis non-interference compensation value $v_{ddcp}^*$ on the basis of the q-axis current command value $i_q^*$ to compensate for the before-compensation d-axis voltage command value $v_{dcur}^*$ and calculates the first q-axis non-interference compensation value $v_{qdcp}^*$ on the basis of the d-axis current command value $i_d^*$ to compensate for the before-compensation q-axis voltage command value $v_{qcur}^*$. Further, the vector control unit 15 includes the second non-interference control unit 70 that cancels out the interference component of the d-axis current generated in the specific rotation range of the motor M with the q-axis current and the interference component of the q-axis current generated in the specific rotation range with the d-axis current by using the variable integral gain (the d-axis variable integral gain $k_{iddcp}$ and the q-axis variable integral gain $k_{iqdcp}$) varying depending on the motor rotation speed.

In the motor control device of the present embodiment, the variable integral gain varies depending on the motor rotation speed, and an interference component that is generated in the specific rotation range of the motor is canceled out by using this variable integral gain. That is, in the motor control device of the present embodiment, it is possible to change the variable integral gain depending on the rotation speed at a current point in time of the motor M, select the variable integral gain suitable for the rotation speed of the motor M, and cancel out the interference component. Therefore, according to the motor control device of the present embodiment, it becomes possible to improve responsiveness of the current control of the motor by reducing an influence of the interference component generated in the specific rotation range of the motor on the control.

Further, in the motor control device of the present embodiment, the current control unit 50 includes the d-axis integral gain multiplication unit 51a that multiplies the deviation between the d-axis current command value $i_d^*$ and the d-axis current detection value $i_d$ by the integral gain $k_{idcur}$, and the d-axis integrator 51b that integrates the output from the d-axis integral gain multiplication unit 51a. Further, the current control unit 50 includes the q-axis integral gain multiplication unit 52a that multiplies the deviation between the q-axis current command value $i_q^*$ and the q-axis current detection value $i_q$ by the integral gain $k_{iqcur}$, and the q-axis integrator 52b that integrates the output from the q-axis integral gain multiplication unit 52a. Further, the second non-interference control unit 70 adds or subtracts a calculation result based on the variable integral gain to or from the output of the d-axis integral gain multiplication unit 51a and the output of the q-axis integral gain multiplication unit 52a.

According to the motor control device of the present embodiment as described above, the calculation result based on the variable integral gain is added or subtracted to or from the output of the d-axis integral gain multiplication unit 51a and the output of the q-axis integral gain multiplication unit 52a. Therefore, it is not necessary to separately provide an integrator that integrates the calculation result based on the variable integral gain, and to simplify a calculation.

Further, in the motor control device of the present embodiment, the second non-interference control unit 70 sets the variable integral gain on the basis of the variable integral gain adjustment coefficient map in which the motor rotation speed and the variable integral gain adjustment coefficient are associated with each other. Therefore, it is possible to set the variable integral gain through simple processing.

Further, in the motor control device of the present embodiment, the first non-interference control unit 60 calculates the first d-axis non-interference compensation value $v_{ddcp}^*$ and the first q-axis non-interference compensation value $v_{qdcp}^*$ using the first non-interference gain (the first d-axis non-interference gain $k_{dff}$ and the first q-axis non-interference gain $k_{qff}$) varying depending on the motor rotation speed. Therefore, it is possible to calculate the first d-axis non-interference compensation value $v_{ddcp}^*$ and the first q-axis non-interference compensation value $v_{qdcp}^*$ suitable for the rotation speed of the motor M.

Further, in the motor control device of the present embodiment, the first non-interference control unit 60 sets the first non-interference gain on the basis of the first non-interference gain map (the first d-axis non-interference gain map $k_{dff}^{map}$ and the first q-axis non-interference gain map $k_{qff}^{map}$) in which the motor rotation speed and the first non-interference gain are associated with each other. Therefore, it is possible to set the first non-interference gain through simple processing.

Although the preferred embodiment of the present invention has been described above with reference to the accompanying drawings, it is obvious that the present invention is not limited to the embodiment. Various shapes or combinations of the constituent members shown in the above-described embodiment are examples, and various changes can be performed on the basis of design requirements or the like without departing from the spirit of the present invention.

Further, in the above embodiment, the step-up and down converter 2a is a power circuit called a so-called magnetically coupled interleaved chopper circuit. However, the present invention is not limited thereto. For example, a single chopper type or another step-up type converter may be used.

Further, in the embodiment, the configuration in which the motor M and the generator G are connected to the power converter 2 has been described. However, the present invention is not limited thereto. For example, the present invention may have a configuration in which the generator G is not connected to the power converter 2, or a configuration in which two or more motors M are connected to the power converter 2.

EXPLANATION OF REFERENCES

1 Control device (motor control device)
2 Power converter
3 Power converter control unit
4 Current sensor
5 Rotation angle sensor
11 Torque control unit
12 Current detection unit
13 Three-phase/dq conversion unit
14 Angular velocity calculation unit
15 Vector control unit
16 dq/three-phase conversion unit
17 PWM control unit
20 First subtractor
30 Second subtractor
40 Calculation unit
50 Current control unit
51 d-axis current control unit
51a d-axis integral gain multiplication unit
51b d-axis integrator
51c d-axis proportional gain multiplication unit
51d Adder
52 q-axis current control unit
52a q-axis integral gain multiplication unit
52b q-axis integrator
52c q-axis proportional gain multiplier
52d Adder
60 First non-interference control unit
61 First d-axis non-interference control unit
61a q-axis inductance calculation unit
61b Multiplier
61c Low pass filter
61d First d-axis non-interference gain multiplication unit
61e Multiplier
61f Subtractor
62 First q-axis non-interference control unit
62a d-axis inductance calculation unit
62b Multiplier
62c Low pass filter
62d First q-axis non-interference gain multiplication unit
62e Multiplier
62f Adder
62g Interlinkage magnetic flux calculation unit
70 Second non-interference control unit
71 Second d-axis non-interference control unit
71a Multiplier
71b d-axis variable integral gain multiplication unit
71c Subtractor
72 Second q-axis non-interference control unit
72a Multiplier
72b q-axis variable integral gain multiplication unit
72c Adder
M Motor

What is claimed is:

1. A motor control device comprising a vector control unit configured to calculate a d-axis voltage command value and a q-axis voltage command value on a basis of a d-axis current command value and a q-axis current command value,
   wherein the vector control unit includes:
      a current control unit configured to calculate a before-compensation d-axis voltage command value based on the d-axis current command value and a d-axis current detection value, and a before-compensation q-axis voltage command value based on the q-axis current command value and a q-axis current detection value;
      a first non-interference control unit configured to calculate a first d-axis non-interference compensation value on a basis of the q-axis current command value to compensate for the before-compensation d-axis voltage command value and calculate a first q-axis non-interference compensation value on a basis of the d-axis current command value to compensate for the before-compensation q-axis voltage command value; and
      a second non-interference control unit configured to cancel out an interference component of a d-axis current generated in a specific rotation range of a motor with a q-axis current and an interference component of the q-axis current generated in the specific rotation range with the d-axis current by using a variable integral gain varying depending on a motor rotation speed.

2. The motor control device according to claim 1, wherein the current control unit includes:
- a d-axis integral gain multiplication unit configured to multiply a deviation between the d-axis current command value and the d-axis current detection value by an integral gain;
- a d-axis integrator configured to integrate an output from the d-axis integral gain multiplication unit;
- a q-axis integral gain multiplication unit configured to multiply a deviation between the q-axis current command value and the q-axis current detection value by an integral gain; and
- a q-axis integrator configured to integrate an output from the q-axis integral gain multiplication unit, and wherein the second non-interference control unit adds or subtracts a calculation result based on the variable integral gain to or from an output of the d-axis integral gain multiplication unit and an output of the q-axis integral gain multiplication unit.

3. The motor control device according to claim 2, wherein the second non-interference control unit sets the variable integral gain on a basis of a variable integral gain adjustment coefficient map in which the motor rotation speed and a variable integral gain adjustment coefficient are associated with each other.

4. The motor control device according to claim 3, wherein the first non-interference control unit calculates the first d-axis non-interference compensation value and the first q-axis non-interference compensation value by using a first non-interference gain varying depending on the motor rotation speed.

5. The motor control device according to claim 4, wherein the first non-interference control unit sets the first non-interference gain on a basis of a first non-interference gain map in which the motor rotation speed and the first non-interference gain are associated with each other.

6. The motor control device according to claim 2, wherein the first non-interference control unit calculates the first d-axis non-interference compensation value and the first q-axis non-interference compensation value by using a first non-interference gain varying depending on the motor rotation speed.

7. The motor control device according to claim 6, wherein the first non-interference control unit sets the first non-interference gain on a basis of a first non-interference gain map in which the motor rotation speed and the first non-interference gain are associated with each other.

8. The motor control device according to claim 1, wherein the second non-interference control unit sets the variable integral gain on a basis of a variable integral gain adjustment coefficient map in which the motor rotation speed and a variable integral gain adjustment coefficient are associated with each other.

9. The motor control device according to claim 8, wherein the first non-interference control unit calculates the first d-axis non-interference compensation value and the first q-axis non-interference compensation value by using a first non-interference gain varying depending on the motor rotation speed.

10. The motor control device according to claim 9, wherein the first non-interference control unit sets the first non-interference gain on a basis of a first non-interference gain map in which the motor rotation speed and the first non-interference gain are associated with each other.

11. The motor control device according to claim 1, wherein the first non-interference control unit calculates the first d-axis non-interference compensation value and the first q-axis non-interference compensation value by using a first non-interference gain varying depending on the motor rotation speed.

12. The motor control device according to claim 11, wherein the first non-interference control unit sets the first non-interference gain on a basis of a first non-interference gain map in which the motor rotation speed and the first non-interference gain are associated with each other.

* * * * *